(12) United States Patent
Kawai et al.

(10) Patent No.: US 12,650,197 B2
(45) Date of Patent: Jun. 9, 2026

(54) VACUUM-INSULATED DOUBLE-WALL PIPING FOR TRANSPORTING CRYOGENIC FLUID

(71) Applicant: TB Global Technologies Ltd., Tokyo (JP)

(72) Inventors: Tsutomu Kawai, Nagaoka (JP); Yuma Yoshihara, Nagaoka (JP)

(73) Assignee: TB Global Technologies Ltd., Tokyo (JP)

( * ) Notice: Subject to any disclaimer, the term of this patent is extended or adjusted under 35 U.S.C. 154(b) by 398 days.

(21) Appl. No.: 18/577,108

(22) PCT Filed: Nov. 28, 2022

(86) PCT No.: PCT/JP2022/043712
§ 371 (c)(1),
(2) Date: Jan. 5, 2024

(87) PCT Pub. No.: WO2023/106147
PCT Pub. Date: Jun. 15, 2023

(65) Prior Publication Data
US 2024/0301984 A1      Sep. 12, 2024

(30) Foreign Application Priority Data

Dec. 8, 2021 (JP) ................................. 2021-199512

(51) Int. Cl.
*F16L 27/11*       (2006.01)
*F16L 9/18*        (2006.01)
(Continued)

(52) U.S. Cl.
CPC ................. *F16L 57/02* (2013.01); *F16L 9/18* (2013.01); *F16L 59/065* (2013.01)

(58) Field of Classification Search
CPC ......... F16L 27/11; F16L 27/12; F16L 59/141; F16L 59/143
See application file for complete search history.

(56) References Cited

U.S. PATENT DOCUMENTS 3,068,026 A * 12/1962 Mckamey ............. F16L 39/005
                                                    62/50.7
4,099,746 A * 7/1978 Kontsch ................. H02G 15/34
                                                    285/123.17

(Continued)

FOREIGN PATENT DOCUMENTS

CN        112682620 A       4/2021
JP        S56-24285 A       3/1981
(Continued)

OTHER PUBLICATIONS

The extended European search report of the corresponding EP application No. 22904078.7 mailed Oct. 24, 2025.

(Continued)

*Primary Examiner* — Paul J Gray
(74) *Attorney, Agent, or Firm* — Muncy, Geissler, Olds & Lowe, P.C.

(57)        ABSTRACT

Vacuum-insulated double-wall piping for transporting a cryogenic fluid includes an inner pipe that includes a bellows part, and an outer pipe that is provided to the outer periphery of the inner pipe with a vacuum layer interposed therebetween, the vacuum-insulated double-wall piping having a straight pipe section and elbow sections. The vacuum-insulated double-wall piping is characterized in that the bellows part is provided to an inner-pipe straight pipe section positioned in the straight pipe section, protruding parts that protrude outward toward the outer pipe are provided to inner-pipe elbow sections positioned in the elbow sections, and receiving parts that come into contact with the protruding parts are provided to outer-pipe elbow sections (Continued)

positioned in the elbow sections, contact surfaces of at least the protruding parts or the receiving parts furthermore being configured from heat-insulating members.

4 Claims, 5 Drawing Sheets

(51) Int. Cl.
   *F16L 57/02*        (2006.01)
   *F16L 59/065*       (2006.01)

(56)                    References Cited

U.S. PATENT DOCUMENTS 5,368,338 A * 11/1994 Greene .................... F16L 39/00
                                                    285/915
8,590,942 B2 * 11/2013 Kouketsu .............. F16L 59/065
                                                    285/123.3

2002/0089177 A1 * 7/2002 Bonn .................... F16L 39/005
                                                    285/123.5

FOREIGN PATENT DOCUMENTS

JP        H05-32717 Y2      8/1993
JP        2008121746 A      5/2008

OTHER PUBLICATIONS

Examination report No. 1 for standard patent application of the corresponding Australian application No. 2022405863 issued Nov. 21, 2025.
International Preliminary Report on Patentability of the corresponding International Application No. PCT/JP2022/043712 of which the Date of completion is Aug. 7, 2023.

* cited by examiner

VACUUM-INSULATED DOUBLE-WALL PIPING FOR TRANSPORTING CRYOGENIC FLUID

TECHNICAL FIELD

The present invention relates to vacuum-insulated double-wall piping for transporting a cryogenic fluid.

BACKGROUND ART

In the prior art, vacuum-insulated double-wall piping has been used as piping for transporting cryogenic fluids such as liquefied hydrogen in order to reduce the amount of heat entering from the exterior and prevent liquefied air from being produced near an outer surface.

In such vacuum-insulated double-wall piping for transporting cryogenic fluids, when a cryogenic fluid is transported, an inner pipe through which the cryogenic fluid flows is affected by the cryogenic fluid, the inner pipe reaching an ultra-low temperature and contracting, but an outer pipe is not affected by the cryogenic fluid and, due to being at roughly the same temperature as outside air (substantially normal temperature), does not contract in the same manner as the inner pipe.

Thus, because a difference in contraction occurs between the inner pipe and the outer pipe during transport of the cryogenic fluid in the vacuum-insulated double-wall piping for transporting cryogenic fluids, a bellows 34 for ameliorating the difference in contraction occurring between the inner pipe 31 and the outer pipe 32 is provided to the inner pipe 31 in the prior art, as shown in FIG. 5.

DISCLOSURE OF THE INVENTION

Problem to be Solved by the Invention

However, because the bellows 34 provided to the inner pipe 31 cannot be subjected to loads resulting from the internal pressure of the cryogenic fluid flowing through the inner pipe 31, there is a concern that an internal-pressure load F will act on an elbow section 36 (corner section) of the inner pipe 31 as shown in FIG. 5, the load will act as a moment F·L on a connection part 41 at a position set apart from the elbow section 36 by a distance L, and high stress will be generated in the connection part 41, resulting in damage.

The present invention overcomes the abovementioned problem in such prior-art examples, it being an object of the present invention to provide vacuum-insulated double-wall piping for transporting a cryogenic fluid comprising a function for reducing, to the greatest extent possible, the acting of a moment on connection parts between an inner pipe and an outer pipe, the moment resulting from an internal-pressure load, and for preventing the connection parts from being damaged due to generation of stress.

Means for Solving the Abovementioned Problem

The main points of the present invention are described below with reference to the accompanying drawings.

In a first aspect, the present invention relates to vacuum-insulated double-wall piping for transporting a cryogenic fluid comprising an inner pipe 1 that includes a bellows part 4, and an outer pipe 2 that is provided to the outer periphery of the inner pipe 1 with a vacuum layer 3 interposed therebetween, the vacuum-insulated double-wall piping having a straight pipe section 5 and elbow sections 6, wherein the vacuum-insulated double-wall piping is characterized in that the bellows part 4 is provided to an inner-pipe straight pipe section 5a positioned in the straight pipe section 5, protruding parts 7 that protrude outward toward the outer pipe 2 are provided to inner-pipe elbow sections 6a positioned in the elbow sections 6, and receiving parts 8 that come into contact with the protruding parts 7 are provided to outer-pipe elbow sections 6b positioned in the elbow sections 6, contact surfaces of at least the protruding parts 7 or the receiving parts 8 furthermore being configured from heat-insulating members 9.

In a second aspect, the present invention relates to the vacuum-insulated double-wall piping for transporting a cryogenic fluid according to the first aspect, characterized in that the protruding parts 7 and the receiving parts 8 are provided on a pipe central axis a of the inner pipe 1, and the protruding parts 7 and the receiving parts 8 protrude in the direction of the pipe central axis a.

In a third aspect, the present invention relates to the vacuum-insulated double-wall piping for transporting a cryogenic fluid according to the first aspect, characterized in that the protruding parts 7 are configured to movably come into contact with the receiving parts 8.

In a fourth aspect, the present invention relates to the vacuum-insulated double-wall piping for transporting a cryogenic fluid according to the second aspect, characterized in that the protruding parts 7 are configured to movably come into contact with the receiving parts 8.

In a fifth aspect, the present invention relates to the vacuum-insulated double-wall piping for transporting a cryogenic fluid according to any of the first to fourth aspects, characterized in that accommodation parts 10 that accommodate the protruding parts 7 are provided to the outer-pipe elbow sections 6b, and the receiving parts 8 are provided to the accommodation parts 10.

In a sixth aspect, the present invention relates to the vacuum-insulated double-wall piping for transporting a cryogenic fluid according to the fifth aspect, characterized in that the receiving parts 8 are configured as threaded bodies and are threaded into the accommodation parts 10 from the outside so as to protrude into the accommodation parts 10.

Effect of the Invention

Due to being configured as described above, the present invention provides vacuum-insulated double-wall piping for transporting a cryogenic fluid comprising a function for reducing, to the greatest extent possible, the acting of a moment on connection parts between an inner pipe and an outer pipe, the moment resulting from an internal-pressure load, and for preventing the connection parts from being damaged due to generation of stress.

BEST MODE FOR CARRYING OUT THE INVENTION

Figure 1:
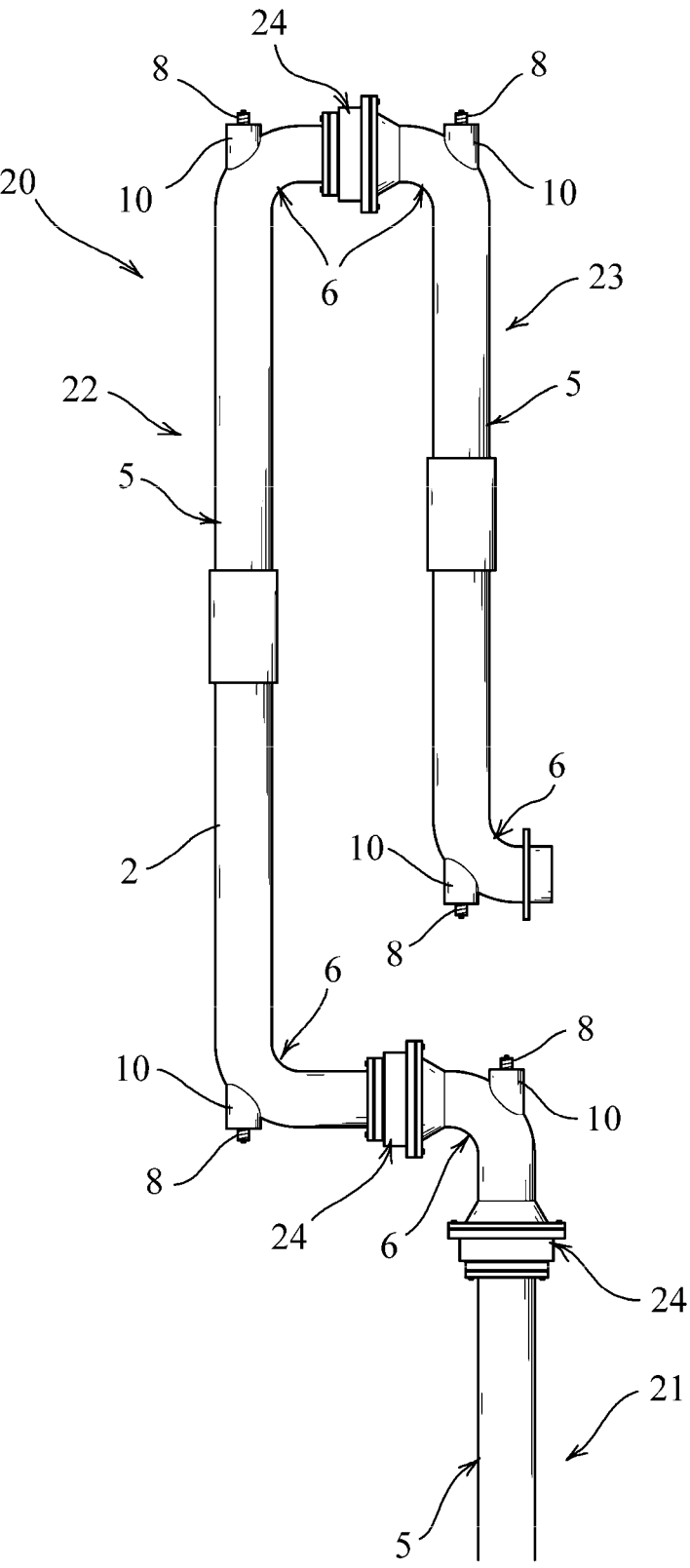
FIG. 1 is a front view showing elements (pipe parts and swivel joints) of the present example.

A preferred embodiment of the present invention is briefly described below with reference to the diagrams while indicating the action of the present invention.

In the present invention, protruding parts 7 are provided to inner-pipe elbow sections 6a of an inner pipe 1, and receiving parts 8 that come into contact with the protruding parts 7 are provided to outer-pipe elbow sections 6b of an outer pipe 2, the outer-pipe elbow sections 6b being provided outside of the inner-pipe elbow sections 6a. Accordingly, when an internal-pressure load produced in the inner pipe 1 acts on the inner-pipe elbow sections 6a, the inner pipe 1 will be in an immovable state because the internal-pressure load is received by the outer pipe 2 as a tensile load. Therefore, no moment will act as in a prior-art example (refer to FIG. 5).

Thus, the acting of a moment on connection parts 11 at positions that are set apart from elbow sections 6 by a prescribed distance is reduced to the greatest extent possible, and the connection parts 11 are prevented from being damaged due to generation of stress.

Additionally, in the present invention, the protruding parts 7 and the receiving parts 8 make mutual contact with heat-insulating members 9 interposed therebetween. Therefore, heat is not conducted between the inner pipe 1 and the outer pipe 2 via contact between the protruding parts 7 and the receiving parts 8, and evaporation of a cryogenic fluid due to heat entering from the exterior, or production of liquefied air near an outer surface due to reduction in the temperature of the outer pipe 2, is prevented to the greatest extent possible.

EXAMPLES

A specific example of the present invention is described below with reference to the diagrams.

The present example is a case in which the vacuum-insulated double-wall piping for transporting a cryogenic fluid according to the present invention is applied to a loading arm 20 for a cryogenic fluid (i.e., a fluid-loading device), the loading arm 20 being used for loading a cryogenic fluid such as liquefied hydrogen between a large body of water (a ship) and a shore, pier, or the like.

The vacuum-insulated double-wall piping for transporting a cryogenic fluid according to the present invention is not limited to this usage.

The loading arm 20 for a cryogenic fluid in the present example is provided with pipe parts including a base riser 21, an inboard arm 22, and an outboard arm 23 that each have an elbow section 6 at one or both ends of a straight pipe section 5, as shown in FIG. 1, the pipe parts being rotatably linked to one another via swivel joints 24.

Vacuum-insulated double-wall piping that is suited for transporting a cryogenic fluid is used in the pipe parts including the base riser 21, the inboard arm 22, and the outboard arm 23.

The pipe parts in the present example are described below using the inboard arm 22 as an example.

The inboard arm 22 in the present example is configured such that elbow sections 6 are provided to both ends of the straight pipe section 5 and the swivel joints 24 are provided to tips of each of the elbow sections 6, as shown in FIG. 1.

Figure 2:
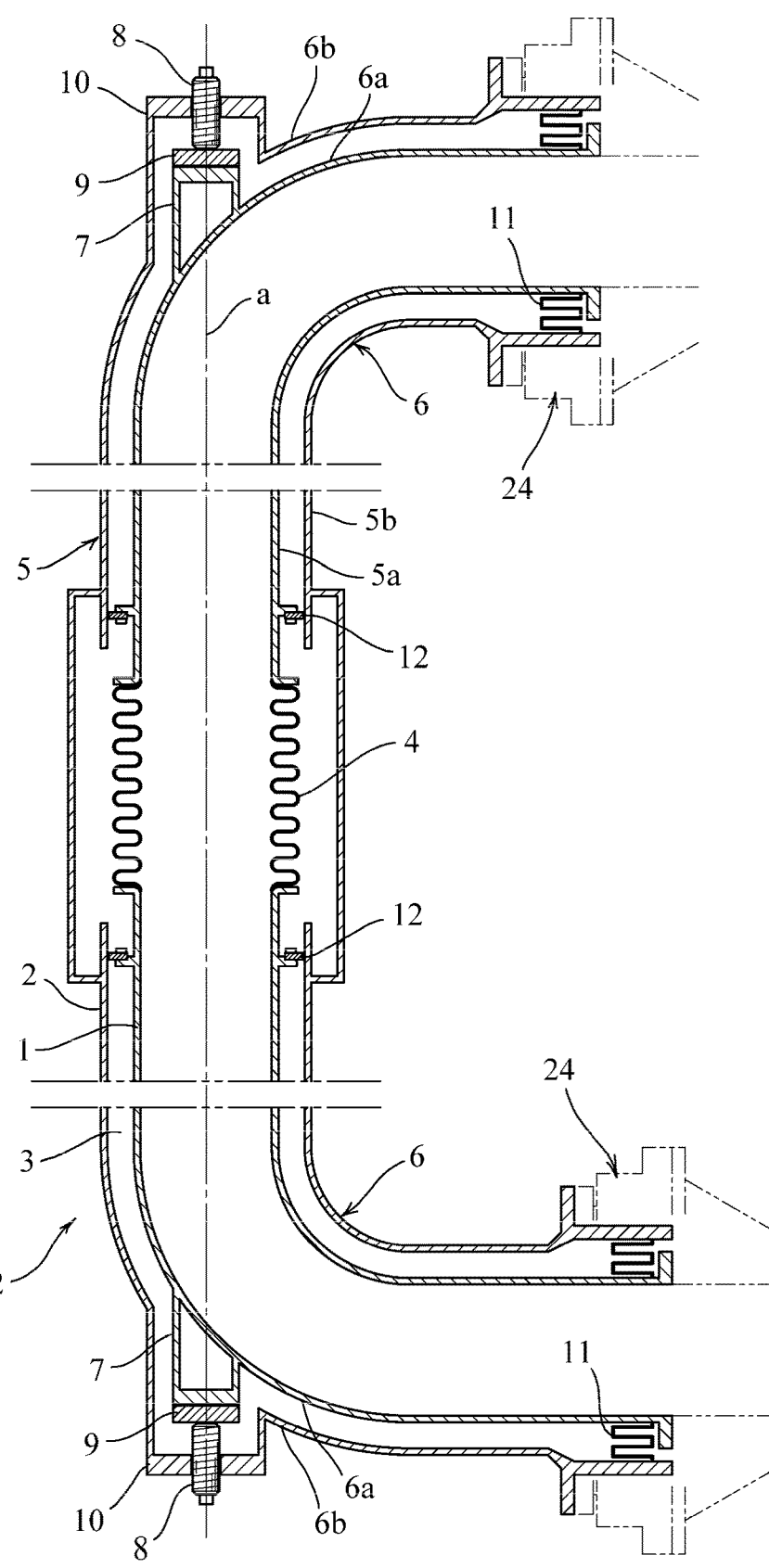
FIG. 2 is an explanatory front cross-sectional view showing an inboard arm (structure of pipe parts) in the present example.

Additionally, the inboard arm 22 is configured from vacuum-insulated double-wall piping formed from the inner pipe 1 and the outer pipe 2 that is provided to the outer periphery of the inner pipe 1, as shown in FIG. 2, the inner pipe 1 and the outer pipe 2 being connected (linked) to one another at each end section via connection parts 11, which are formed in a meandering shape, and a space section between the inner pipe 1 and the outer pipe 2 furthermore being employed as a vacuum layer 3.

Specifically, in the inner pipe 1, a bellows part 4 is provided to a substantially central position in an inner-pipe straight pipe section 5a positioned in the straight pipe section 5 of the inboard arm 22, and protruding parts 7 that come into contact with receiving parts 8 of the outer pipe 2 (described later) are provided to each of the inner-pipe elbow sections 6a provided to the two ends of the inner-pipe straight pipe section 5a, the inner-pipe elbow sections 6a being positioned in the elbow sections 6 of the inboard arm 22.

The protruding parts 7 are formed as hollow cylinders, and heat-insulating members 9 (for which fiber-reinforced plastic (FRP) members are employed in the present example) are furthermore provided to the distal ends of the protruding parts 7, the protruding parts 7 being provided on a pipe central axis a of the inner pipe 1 so as to protrude outward (toward the outer pipe 2) in the direction of the pipe central axis a.

Figure 3:
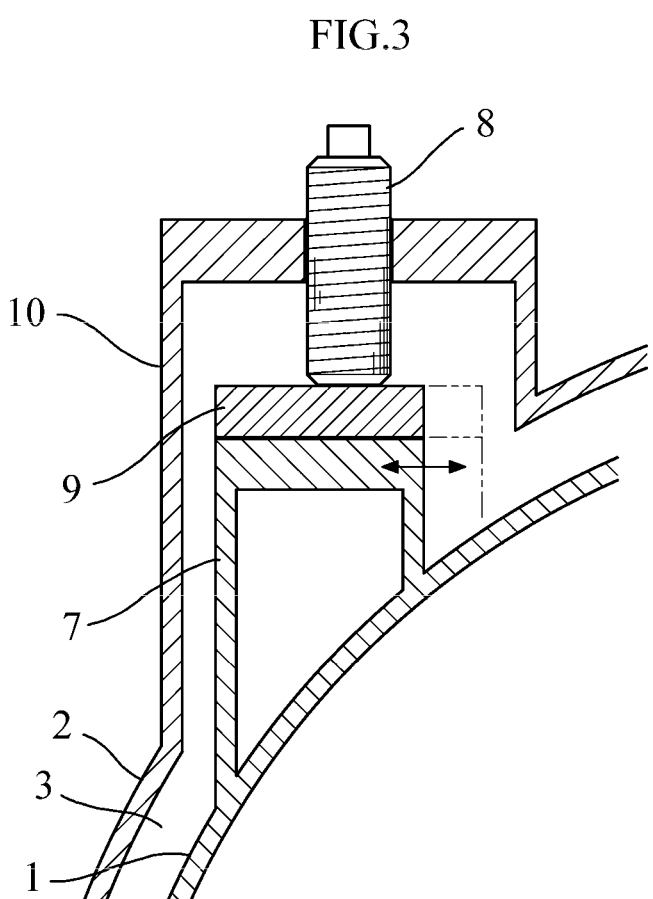
FIG. 3 is an explanatory front cross-sectional view showing a state of contact between a protruding part and a receiving part in the present example.

Specifically, the protruding parts 7 in the present example are not linked to the receiving parts 8 and are instead configured to movably come into contact with the receiving parts 8, as shown in FIG. 3.

Centering parts 12 for positioning the inner pipe 1 at a central position relative to the outer pipe 2 are provided to substantially central positions in the inner-pipe straight pipe section 5a of the inner pipe 1 in the present example.

Figure 4:
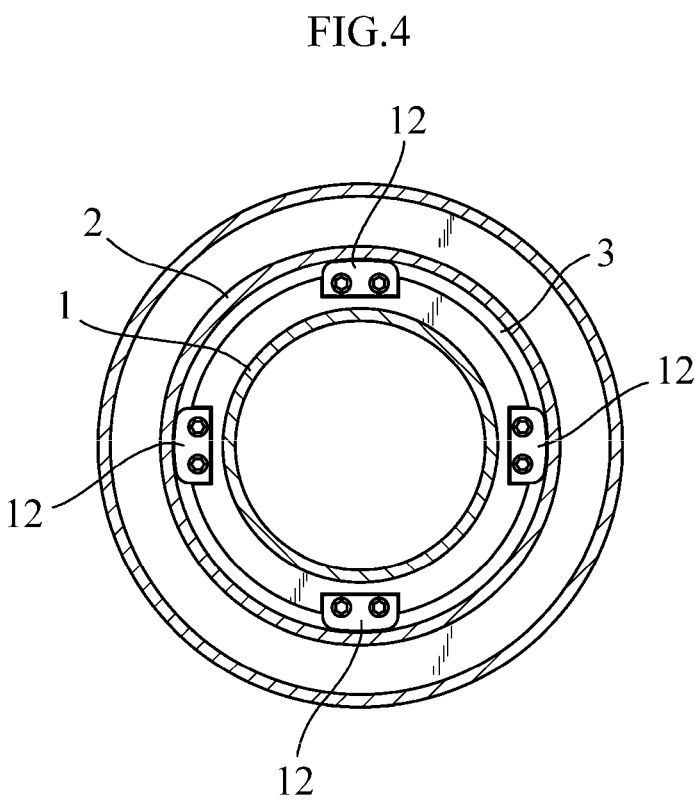
FIG. 4 is an explanatory side cross-sectional view showing the inboard arm (structure of pipe parts) in the present example.

The centering parts 12 are configured from heat-insulating members (for which fiber-reinforced plastic (FRP) members are employed in the present example). As shown in FIG. 4, the centering parts 12 are provided to the outer surface of the inner pipe 1 at intervals of 90° in the circumferential direction (in four directions relative to the inner pipe 1, i.e., above, below, and to the left and right sides thereof) so as to come into contact with the inner surface of the outer pipe 2.

In the outer pipe 2, the receiving parts 8, which come into contact with the protruding parts 7 of the inner pipe 1 that were described previously, are provided to each of two outer-pipe elbow sections 6b that are provided to both ends of an outer-pipe straight pipe section 5b, the outer-pipe elbow sections 6b being positioned in the elbow sections 6 of the inboard arm 22.

Specifically, the receiving parts 8 in the present example are provided to accommodation parts 10 that accommodate the protruding parts 7 of the inner pipe 1, the accommodation parts 10 being provided to the outer-pipe elbow sections 6b of the outer pipe 2.

More specifically, the receiving parts 8 are configured as threaded bodies and are threaded into the accommodation parts 10 from the outside so as to protrude into the accommodation parts 10, as shown in FIG. 3.

Specifically, the receiving parts 8 in the present example are configured to be provided to the accommodation parts 10 through a threading operation from outside the outer pipe 2, and furthermore are configured such that the amount by which the receiving parts 8 protrude inward can be adjusted using the amount of threading.

In the present example, the threading operation is performed until the receiving parts 8 come into contact with the protruding parts 7, the threading operation is stopped once the receiving parts 8 have come into contact with the protruding parts 7, and the receiving parts 8 are welded securely to the accommodation parts 10. The securing means is not limited to welding and can be changed as appropriate. The base riser 21 and the outboard arm 23 have the same vacuum-insulated-double-piping structure as the inboard arm 22 described above and therefore are not described here.

The action and effects of the pipe parts in the present example configured as described above (vacuum-insulated double-wall piping for transporting cryogenic fluid) shall now be described.

Figure 5:
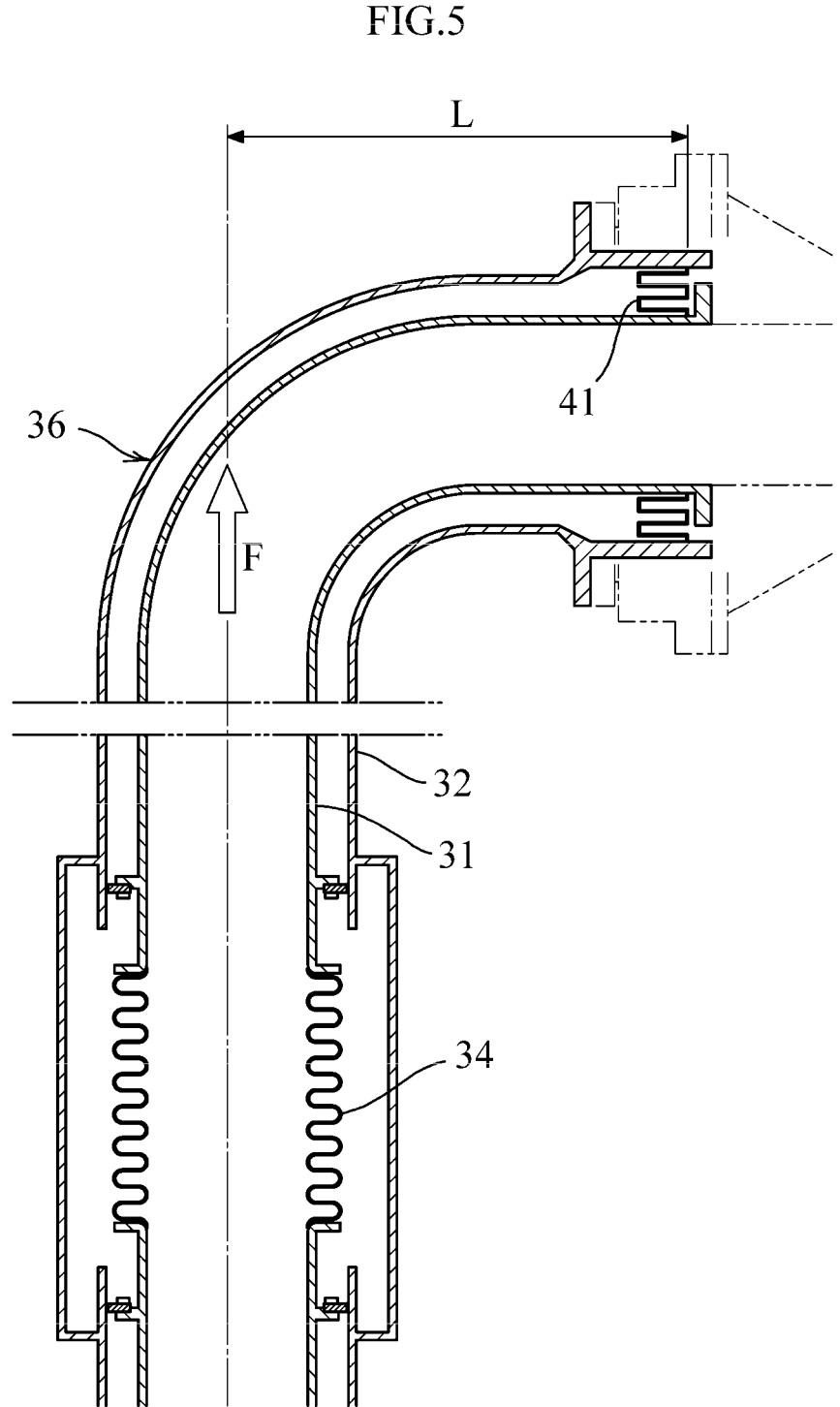
FIG. 5 is an explanatory front cross-sectional view showing a prior-art example.

In the pipe parts in the present example (the base riser 21, the inboard arm 22, and the outboard arm 23), the protruding parts 7 are provided to the inner-pipe elbow sections 6a of the inner pipe 1, and the receiving parts 8 that come into contact with the protruding parts 7 are provided to the outer-pipe elbow sections 6b of the outer pipe 2, the outer-pipe elbow sections 6b being provided outside of the inner-pipe elbow sections 6a; accordingly, when an internal-pressure load produced in the inner pipe 1 acts on the inner-pipe elbow sections 6a, the inner pipe 1 will be in an immovable state because the internal-pressure load is received by the outer pipe 2, and therefore, no moment will act as in a prior-art example (refer to FIG. 5).

Moreover, in the present example, the protruding parts 7 of the inner pipe 1 and the receiving parts 8 of the outer pipe 2 are both provided on the pipe central axis a of the inner pipe 1; accordingly, the internal-pressure load acting on the inner-pipe elbow sections 6a of the inner pipe 1 can be received by the outer pipe 2 as a simple tensile load.

Thus, the acting of a moment on the connection parts 11 connecting the inner pipe 1 and the outer pipe 2 can be reduced to the greatest extent possible, and the connection parts 11 can, to the greatest extent possible, be prevented from being damaged due to generation of stress.

Additionally, as pertains to the protruding parts 7 and the receiving parts 8 in the present example, heat-insulating members 9 (FRP) are provided to the distal ends of the protruding parts 7, and the protruding parts 7 and the receiving parts 8 are configured to make mutual contact with the heat-insulating members 9 interposed therebetween; accordingly, heat is not conducted between the inner pipe 1 and the outer pipe 2 via contact between the protruding parts 7 and the receiving parts 8, and evaporation of the cryogenic fluid due to heat entering from the exterior, or production of liquefied air near an outer surface due to reduction in the temperature of the outer pipe 2, is prevented to the greatest extent possible.

Furthermore, as pertains to the protruding parts 7 and the receiving parts 8 in the present example, the protruding parts 7 and the receiving parts 8 make mutual contact in an unlinked manner, and the protruding parts 7 of the inner pipe 1 are configured to be capable of moving relative to the receiving parts 8 of the outer pipe 2; accordingly, even when movement occurs in a direction intersecting (orthogonal to) the pipe central axis a of the inner pipe 1, the protruding parts 7 will move in accordance with the movement, whereby no load will be produced in portions of the protruding parts 7 and the receiving parts 8 that make mutual contact, and the protruding parts 7 and the receiving parts 8 will be prevented from being damaged.

Additionally, as pertains to the protruding parts 7 and the receiving parts 8 in the present example, the receiving parts 8 are configured as threaded bodies and are configured to be threaded in from the exterior and brought into contact with the protruding parts 7, which yields a simpler structure and enables the protruding parts 7 and the receiving parts 8 to be easily and reliably provided in a state of contact.

Vacuum-insulated double-wall piping that exhibits the action and effects described above is used in the pipe parts of the loading arm 20 for a cryogenic fluid in the present example; accordingly, the pipe will have a larger opening diameter (e.g., such that the diameter of the inner pipe 1 is 16 inches and the diameter of the outer pipe 2 is 20 inches), and the loading arm 20 for a cryogenic fluid will have exceptional utility such that, even if a high internal-pressure load acts on the inner-pipe elbow sections 6a of the inner pipe 1, the acting of a moment on the connection parts 11 will be suppressed and damage of the connection parts 11 will be reduced to the greatest extent possible.

The present invention is not limited to the present example; the specific configuration of configurational requirements for the present invention can be designed as appropriate.

The invention claimed is:

1. Vacuum-insulated double-wall piping for transporting a cryogenic fluid comprising an inner pipe and an outer pipe that is provided to the outer periphery of the inner pipe with a vacuum layer interposed therebetween, the vacuum-insulated double-walled piping having a straight pipe section that has elbow sections provided to both ends thereof, wherein the vacuum-insulated double-wall piping is characterized in that: in the inner pipe, a bellows part is provided to an inner-pipe straight pipe section positioned in the straight pipe section, and protruding parts are furthermore provided to each of inner-pipe elbow sections positioned in the elbow sections; in the outer pipe, accommodating parts that accommodate the protruding parts are provided to outer-pipe elbow sections positioned in the elbow sections, and receiving parts that come into contact with the protruding parts are provided to the accommodation parts; the protruding parts and the receiving parts are provided on a pipe central axis of the inner pipe; the protruding parts are provided so as to protrude outward along the pipe central axis; the receiving parts are configured as threaded bodies, are threaded into the accommodation parts from the outside, and are configured such that the amount by which the receiving parts protrude into the accommodation parts can be freely adjusted; and the protruding parts and the receiving parts are furthermore configured to make mutual contact with heat-insulating members interposed therebetween.

2. The vacuum-insulated double-wall piping for transporting a cryogenic fluid according to claim 1, characterized in that the protruding parts are configured to movably come into contact with the receiving parts.

3. The vacuum-insulated double-wall piping for transporting a cryogenic fluid according to claim 1, characterized in that: in the inner pipe, a plurality of centering parts are provided to the outer surface of the inner-pipe straight pipe section; and the centering parts are configured from heat-insulating members and are provided so as to come into contact with the inner surface of an outer-pipe straight pipe section of the outer pipe at intervals in the circumferential direction of the inner-pipe straight pipe section.

4. The vacuum-insulated double-wall piping for transporting a cryogenic fluid according to claim 2, characterized in that: in the inner pipe, a plurality of centering parts are provided to the outer surface of the inner-pipe straight pipe section; and the centering parts are configured from heat-insulating members and are provided so as to come into contact with the inner surface of an outer-pipe straight pipe section of the outer pipe at intervals in the circumferential direction of the inner-pipe straight pipe section.

\* \* \* \* \*